United States Patent
Neisen et al.

(10) Patent No.: US 11,203,284 B2
(45) Date of Patent: Dec. 21, 2021

(54) ROAD WORKING MACHINE WITH EGRESS LIGHTING SYSTEM (71) Applicant: Roadtec, Inc., Chattanooga, TN (US)

(72) Inventors: Matthew Neisen, Soddy Daisy, TN (US); Perry Basler, Tunnel Hill, GA (US)

(73) Assignee: Roadtec, Inc., Chattanooga, TN (US)

(*) Notice: Subject to any disclaimer, the term of this patent is extended or adjusted under 35 U.S.C. 154(b) by 0 days.

(21) Appl. No.: 17/103,228

(22) Filed: Nov. 24, 2020

(65) Prior Publication Data
US 2021/0155151 A1   May 27, 2021

Related U.S. Application Data (60) Provisional application No. 62/941,059, filed on Nov. 27, 2019.

(51) Int. Cl.
B60Q 1/24 (2006.01)
B60Q 1/00 (2006.01)
B60Q 1/32 (2006.01)
E02F 9/08 (2006.01)
E02F 9/20 (2006.01)
E02F 9/00 (2006.01)

(52) U.S. Cl.
CPC ............ B60Q 1/24 (2013.01); B60Q 1/0094 (2013.01); B60Q 1/32 (2013.01); E02F 9/00 (2013.01); E02F 9/0833 (2013.01); E02F 9/2095 (2013.01)

(58) Field of Classification Search
CPC . B60Q 1/24; B60Q 1/32; B60Q 1/323; B60Q 1/326; E02F 9/0833
See application file for complete search history.

(56) References Cited

U.S. PATENT DOCUMENTS 8,624,504 B2 * 1/2014 Starkey ................. B60Q 1/323
                                                    315/131
2013/0264940 A1   10/2013 Starkey et al.
2014/0204559 A1   7/2014 Sweeney
2015/0092393 A1   4/2015 Oetken et al.

OTHER PUBLICATIONS

International Search Report and Written Opinion of counterpart PCT Application No. PCT/US/061997 dated Feb. 11, 2021.

* cited by examiner

Primary Examiner — Robert J May
(74) Attorney, Agent, or Firm — Chambliss, Bahner & Stophel, P.C.

(57) ABSTRACT

A road working machine includes an operator's station that is adapted to be occupied by an operator of the road working machine. The road working machine also includes a controller and a safety light circuit that is operatively attached to the controller. The safety light circuit includes a plurality of downwardly directed safety lights that are located so as to provide lighted egress from the operator's station.

16 Claims, 8 Drawing Sheets

ROAD WORKING MACHINE WITH EGRESS LIGHTING SYSTEM

CROSS-REFERENCE TO RELATED APPLICATION

This application claims the benefit of U.S. Provisional Patent Application No. 62/941,059, which was filed on Nov. 27, 2019.

FIELD OF THE INVENTION

This invention relates generally to self-propelled road working machines such as material transfer vehicles, milling machines, road reclaimer/soil stabilizer machines, cold in-place recycling machines, asphalt paving machines and roadway sweeping machines. More particularly, the invention relates to a road working machine that is equipped with an egress lighting system to guide an operator to safety if the operator must exit the machine in the dark.

BACKGROUND OF THE INVENTION

Roadwork is typically carried out by road working machines that carry one or more working components and travel along a roadway. One such road working machine is a milling machine, a wheeled or track-driven vehicle that is provided with a rotating working drum that includes a plurality of cutting teeth. The drum is mounted in a housing on the frame of the machine and adapted to be lowered into contact with the road surface and rotated about a horizontal axis so as to cut into the surface to a desired depth as the machine is advanced along the roadway. Generally, the milling machine also includes a conveyor system that is designed to carry the milled material which has been cut from the roadway by the rotating drum to a location in front of, to the rear of, or beside the machine for deposit into a truck for removal from the milling site. Steerable track or wheel drive assemblies are provided to drive the machine and to steer it along a desired milling path. Power for driving the machine and for operating its systems is typically provided by a diesel engine.

Another type of road working machine is a road reclaimer/soil stabilizer machine. This machine is similar to a milling machine in that it comprises a wheeled or track-driven vehicle that includes a milling assembly comprising a milling drum with a plurality of cutter teeth mounted thereon which is contained within a milling enclosure or chamber. However, the milling drum of a road reclaimer/soil stabilizer machine is generally employed to mill or pulverize an existing road bed or roadway to a greater depth than does a milling machine prior to repaving (usually called reclaiming) or prior to initial paving (usually called stabilizing), and it leaves the pulverized material in place.

Cold in-place recycling ("CIR") machines can be used to repair damage to a roadway in a single pass, while reusing essentially all of the existing asphalt paving material. In the CIR process, damaged layers of asphalt pavement are removed. The removed material is processed and replaced on the roadway and then compacted. If a roadway has good structural strength, CIR can be an effective treatment for all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. CIR can almost always be used when there is no damage to the base of the roadway. Generally, CIR is only half as expensive as a new pavement overlay, while providing approximately 80% of the strength of new pavement. CIR can be carried out by a CIR machine comprising a milling machine or a road reclaimer/soil stabilizer machine that has been modified by mounting an additive spray bar in the milling drum housing to inject an asphalt emulsion or foamed asphalt cement additive into the milling drum housing. The asphalt emulsion or foamed asphalt cement additive is then thoroughly blended with the milled material by the milling drum and can be left in a windrow or fed by the CIR machine's discharge conveyor directly into an asphalt paving machine. When a CIR process is carried out by a modified milling machine or road reclaimer/soil stabilizer machine, the additive material is supplied from a separate additive supply tank truck that is coupled to the modified milling machine or road reclaimer/soil stabilizer machine. The additive material is drawn directly from the tank on the additive supply truck and metered through an additive flow system that is mounted on the milling machine to the spray bar in the milling drum housing.

Because the milling drums and ground-engaging drive assemblies of a milling machine and a road reclaimer/soil stabilizer machine (including those modified to perform a CIR process) operate in the same way for purposes of this invention, the term "milling machine" will be used hereinafter as a generic term that describes all of these machines.

When a milling operation has been completed, it is frequently necessary or useful to employ a roadway sweeping machine to remove any milled material left behind by the milling machine or other debris on the roadway prior to a paving operation. Roadway sweeping machines typically employ a broom assembly comprising one or more brushes mounted for rotation about horizontal and/or vertical axes. Some such machines include an integral component for collecting material swept by the brush or brushes. Such collecting components may comprise vacuum systems for capturing the material swept by the brushes, or conveyors for transporting such material to a hopper or an adjacent truck. Other roadway sweeping machines may operate by pushing the swept material to one side of the roadway where it may be collected by a separate collecting device.

When a milling and sweeping operation, or a reclaiming, stabilizing or CIR operation has been completed, paving of the roadway with asphalt paving material is generally carried out using other road working machines. Asphalt paving material is comprised of an asphaltic binder and aggregates of various particle sizes, including both coarse and fine aggregate materials. Because the equipment needed to produce asphalt paving material is expensive and the space required extensive, asphalt paving material is typically produced in a production facility that is dedicated to such purpose. Consequently, it is frequently necessary to transport the asphalt paving material from its place of origin to an asphalt paving machine at a remote paving site. The asphalt paving material is usually transported in dump trucks to an asphalt paving machine or to a material transfer vehicle that completes the transfer to the asphalt paving machine.

An asphalt paving machine is a self-propelled vehicle that is driven by a wheeled or tracked drive system. In a common type of paving machine, an asphalt receiving hopper is located at the front end of the machine to receive asphalt paving material, and a slat-type hopper conveyor located below the asphalt receiving hopper transfers the asphalt paving material from the hopper to a distribution assembly comprising a transverse distributing auger that is mounted at the rear of the machine. The asphalt paving material is deposited onto and across the roadway or other surface to be paved by the distributing auger, and a floating screed located behind the distributing auger compacts the asphalt paving material to form an asphalt mat.

Sometimes, asphalt paving material is discharged directly from a delivery truck into the asphalt receiving hopper of the asphalt paving machine. A dump-type delivery truck is unloaded by raising the truck bed and allowing the asphalt paving material to slide down the bed into the receiving hopper. When the truck bed is raised, it should not come into contact with the receiving hopper and should not be carried by or ride on any portion of the paving machine. For smaller-capacity dump trucks, contact with the paving machine is not often a problem. However, such contact can be a problem when large tractor-semitrailer units are used as delivery vehicles, particularly when the truck bed is extended to its highest point. In addition, if a delivery truck contacts the asphalt paving machine so that a portion of the weight of the delivery truck is carried by the paving machine as the paving operation is carried out, the screed elevation may be changed, which will affect the elevation and smoothness of the finished asphalt mat.

When asphalt paving material is delivered to the paving machine by delivery trucks, it is frequently necessary for a series of delivery trucks to move into contact with the front end of the paving machine to serially discharge their loads into the paving machine's asphalt receiving hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). In addition, because a typical delivery truck carries more asphalt paving material than can be unloaded quickly into the receiving hopper of the asphalt paving machine, it is frequently necessary for the paving machine to push the truck in the paving direction as the truck is unloaded while paving proceeds. This may be difficult to manage when the paving machine is proceeding through intersections or operating on curved sections of the roadway. Furthermore, the ability of the paving machine operator to place a smooth asphalt mat on the roadway will be affected by the rate of feed of asphalt paving material to the paving machine. This requires planning for proper scheduling of delivery trucks and coordination with the asphalt production facility. However delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

A delivery truck can also be used to deliver the asphalt paving material to a windrow on the roadway in front of the asphalt paving machine. If the delivery truck is a dump truck, the windrow is usually formed by a spreader box or a windrow blending unit. If a spreader box is used, it will be pulled behind the truck, and the truck bed will be raised to deposit the asphalt paving material into the spreader box. As the truck moves forward, the asphalt paving material is uniformly metered out of the spreader box onto the roadway. If a windrow blending unit is used, it will typically be attached to a small front-end loader, and the asphalt paving material dumped onto the existing roadway across the width of the truck bed. The windrow blending unit will fold the asphalt paving material into a windrow as the blending unit is pushed forward by the loader. A bottom-unloading truck may also be used to deposit asphalt paving material in the form of a windrow onto the roadway.

When asphalt paving material is deposited on the roadway in the form of a windrow, it may be picked up from the roadway surface by a windrow elevator that is attached to the front of the asphalt paving machine. However, because it is desirable to keep the paving machine moving at all times while the paving machine is being operated, the windrow method of delivery may still require delivery trucks queueing up near the paving machine to insure that a windrow of asphalt paving material is available as soon as it is needed by the paving machine. This may also result in heat losses in the asphalt paving material in the waiting windrows, which can affect the quality of the asphalt mat being created by the paving machine.

For all of the difficulties associated with the timely delivery of asphalt paving material by individual delivery trucks into the asphalt receiving hopper of a paving machine or in the form of windrows, material transfer vehicles have been used in recent years to transport asphalt paving material to an asphalt paving machine. A material transfer vehicle is a road working machine that may be used to shuttle asphalt paving material between the delivery trucks or windrows and the asphalt paving machine. One type of material transfer vehicle has an asphalt paving material receiving device comprising a truck-receiving hopper into which a delivery truck may dump its entire load. Another type of material transfer vehicle is equipped with an asphalt paving material receiving device comprising a windrow pick-up head that can pick up a windrow of asphalt paving material that has been dumped on the roadway as the material transfer vehicle is moved into the windrow. These vehicles are adapted to move alongside an asphalt paving machine and transfer the asphalt paving material received from the trucks or the windrows into the receiving hopper of the asphalt paving machine. Still another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation.

Self-propelled material transfer vehicles may include an asphalt paving material receiving device comprising a large-capacity truck-receiving hopper or a window pick-up head, and an inclined loading conveyor extending upwardly from the hopper or pick-up head. A transversely oriented auger in the truck-receiving hopper or windrow pick-up head may be provided to urge asphalt paving material onto the loading conveyor. The asphalt paving material is carried upwardly by the loading conveyor from the truck-receiving hopper or pick-up head and discharged off the elevated output end of the loading conveyor into a chute mounted on the lower end of a discharge conveyor, or into an intermediate surge bin that is sized to hold the entire load of a delivery truck. The discharge of asphalt paving material off the elevated output end of the loading conveyor so that it may fall under the influence of gravity into a chute or surge bin assists in preventing undesirable segregation of the various particulate components of the asphalt paving material by particle size.

Material transfer vehicles of the type that are equipped with a surge bin typically include an auger in the surge bin that re-blends the asphalt paving material to eliminate particle size segregation that occurs as the material is transported. It also helps to keep the heat in the asphalt paving material evenly distributed throughout the entire load of material obtained from the delivery truck or windrow. In addition, these material transfer vehicles include a conveyor in the surge bin that is adapted to transfer the asphalt paving material to the discharge conveyor.

Discharge conveyors that are mounted on self-propelled material transfer vehicles with and without surge bins are generally pivotable about a substantially vertical axis so that the material transfer vehicle can be positioned adjacent to an asphalt paving machine that is laying an asphalt mat and rapidly discharge asphalt paving material into the hopper of the paving machine as the material transfer vehicle moves with the paving machine along the roadway. Furthermore, these discharge conveyors are configured so that their discharge end may be raised and lowered to position the discharge outlet advantageously with respect to the asphalt receiving hopper of a paving machine. The moveable nature of these discharge conveyors allows for some flexibility in locating the material transfer vehicle adjacent to the asphalt paving machine. Because of its rapid loading and unloading capabilities, a self-propelled material transfer vehicle equipped with a surge bin can rapidly shuttle between delivery trucks or windrows at a pick-up point and an asphalt paving machine that is laying an asphalt mat at a paving site so that there is less likelihood that the paving machine will have to stop paving because of a lack of asphalt paving material.

When a self-propelled material transfer vehicle is used in an asphalt paving process, a delivery truck can be stopped a significant distance away from the paving machine in order to unload its load from a stopped position into the material transfer vehicle or onto the roadway in the form of a windrow. Thus, the delivery truck can unload faster when not unloading directly into the paving machine, and the unloading location may be selected so that there is no danger of the raised dump bed of the truck hitting power lines or tree limbs on the side of the roadway. The use of a material transfer vehicle also reduces the need for delivery trucks to queue up at the paving machine in order to keep it moving, thereby cutting the waiting time of the delivery trucks and thereby reducing truck operating costs.

It is common for road work to take place at night in order to minimize the inconvenience to highway travelers. It is also common that a road working site may not be well lighted. It is also common for the operator of a road working machine to shut down the machine in an unlighted location in order to wait on the arrival of delivery trucks or other road working machines, to inspect a portion of the road working machine or for other purposes. In addition, sometimes it is necessary for the operator of a road working machine to activate an Emergency Stop button to stop the machine when the operator's safety or the safety of others (or of property) is jeopardized. In all such circumstances, it may be difficult for the operator to see a way to exit the road working machine safely. Furthermore, although some road working machines may be equipped with running lights to allow the operator to see the roadway, conventional road working machines do not include any means for guiding an operator off of the machine in the dark. It would be desirable if safety lighting could be provided for this purpose.

ADVANTAGES OF THE INVENTION

Among the advantages of the invention is that it provides a road working machine that is equipped with a safety lighting system to assist the operator to exit the machine safely in a variety of circumstances. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The term "substantially" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The terms "operatively attached" and "operatively connected" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "road working machine" refers to a self-propelled machine or vehicle that is employed in performing any part of the process of roadbuilding. Road working machines include material transfer vehicles, milling machines, road reclaimer/soil stabilizer machines, asphalt paving machines and roadway sweeping machines.

The term "asphalt paving material" refers to a bituminous paving mixture that is comprised of asphalt cement and crushed stone, recycled asphalt shingles, recycled asphalt pavement materials and/or other aggregate materials of varying particle size, and which is used for paving purposes.

The terms "asphalt paving machine" and "paving machine" refer to a self-propelled finishing machine for applying asphalt paving material to form an asphalt mat on a roadway, parking lot or similar surface. An asphalt paving machine or paving machine is typically a self-propelled vehicle having an asphalt receiving hopper on its front end, a distributing auger for distributing asphalt paving material across a roadway, a conveyor for moving the asphalt paving material from the receiving hopper to the distributing auger, and a floating screed located behind the distributing auger for forming an asphalt mat on the roadway.

The term "asphalt mat" refers to a layer of asphalt paving material such as is applied by an asphalt paving machine to produce a roadway, parking lot or similar surface.

The term "milling machine" refers to a self-propelled machine having a milling drum that is adapted to be rotated so as to cut into the surface on which the machine is operated, and includes machines that may be called milling machines, cold planers, road reclaimer/soil stabilizer machines, and CIR machines.

The term "roadway sweeping machine" refers to a self-propelled machine having a broom assembly comprising one or more brushes that are adapted to be rotated on the roadway to remove milled material and other debris.

The term "material transfer vehicle" refers to a self-propelled vehicle that is adapted to receive asphalt paving material from a delivery truck or a windrow and to transfer the asphalt paving material to the asphalt receiving hopper of an asphalt paving machine.

SUMMARY OF THE INVENTION

The invention comprises a road working machine having an operator's station that is adapted to be occupied by a machine operator. Located in or adjacent to the operator's station is a controller. A safety light circuit is operatively attached to the controller and includes a plurality of downwardly directed safety lights that are located so as to provide lighted egress from the operator's station. Thus, the invention comprises a road working machine having a safety lighting system for guiding the operator of the machine to allow a safe exit from the operator's station in the dark.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described and claimed herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 1:
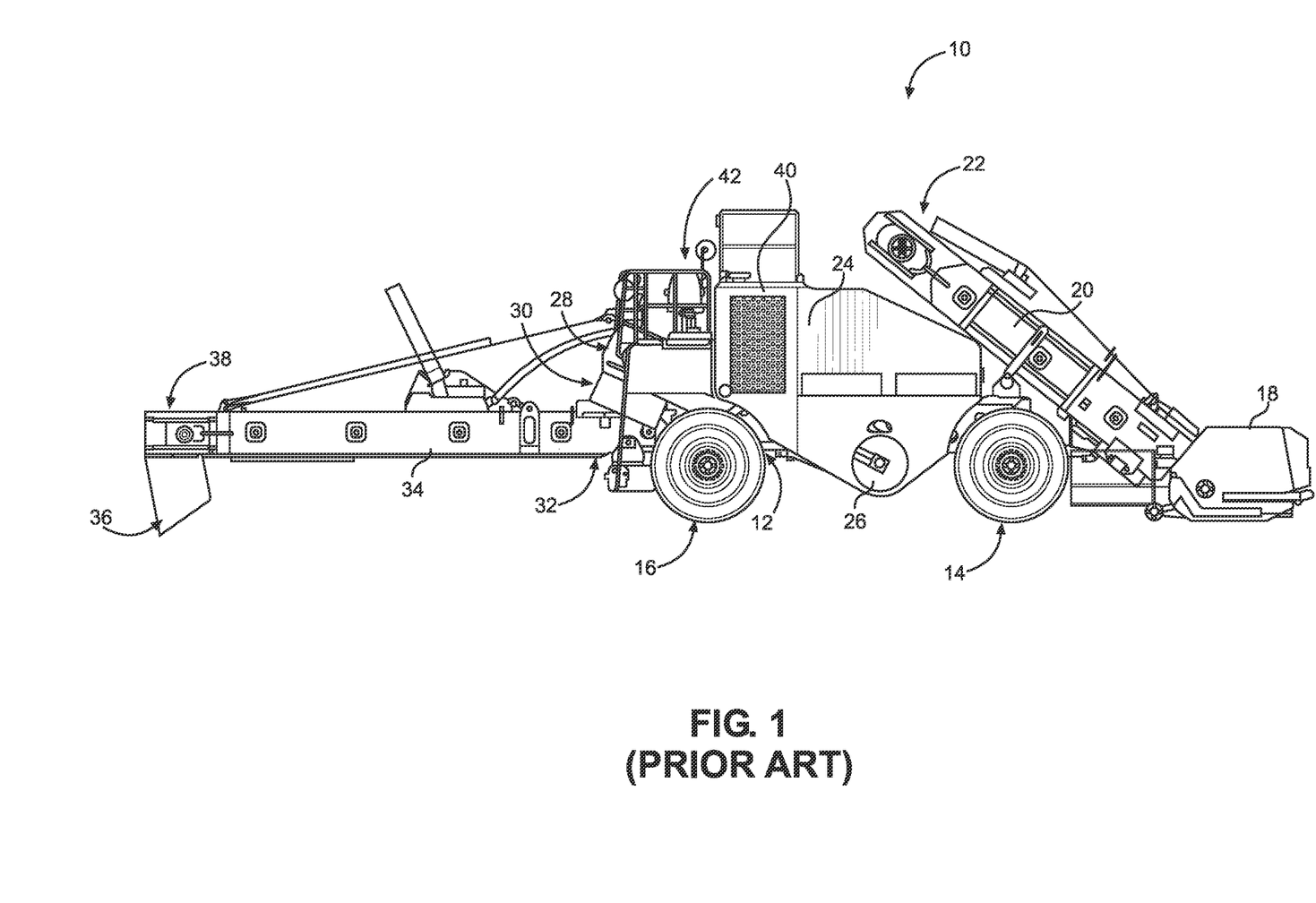
FIG. 1 is a side view of a first embodiment of a conventional material transfer vehicle of a type that may be configured with a safety lighting system according to the invention.

FIG. 1 illustrates a conventional self-propelled material transfer vehicle that may be configured according to the invention. As shown therein, material transfer vehicle 10 includes a frame 12 that is supported on the roadway surface by front and rear ground-engaging drive assemblies including right front drive wheel 14 and right rear drive wheel 16. Material transfer vehicle 10 also includes a left front drive wheel (not shown but substantially similar to right front drive wheel 14) and a left rear drive wheel (not shown but substantially similar to right rear drive wheel 16). Each of the drive wheels is driven by a hydraulic motor (not shown) that is supplied with fluid under pressure by one or more hydraulic pumps (also not shown). In the alternative, the frame of the vehicle may be supported on the roadway surface by ground-engaging drive assemblies comprising one or more left side track-drive assemblies (not shown), and one or more right side track-drive assemblies (also not shown), as is known to those having ordinary skill in the art to which the invention relates.

Vehicle 10 includes an asphalt paving material receiving device comprising a truck-receiving hopper 18. Truck-receiving hopper 18 is adapted to receive asphalt paving material from a delivery truck (not shown). In the alternative, vehicle 10 could be equipped with an asphalt paving material receiving device comprising a windrow pick-up head (not shown). An auger (not shown) is mounted in truck-receiving hopper 18 and is adapted to assist in conveying asphalt paving material from truck-receiving hopper 18 into loading conveyor 20, which in turn conveys the asphalt paving material off of its output end 22 and into surge bin 24. The surge bin includes transverse auger 26 that is employed to mix the asphalt paving material in the surge bin in order to minimize segregation or separation of the aggregate portion of the asphalt paving material by size. Also located in the surge bin is surge conveyor 28, which is adapted to convey asphalt paving material upwardly out of the surge bin so that it may fall through chute 30 and onto input end 32 of discharge conveyor 34. Discharge conveyor 34 is mounted for vertical pivotal movement about a substantially horizontal pivot axis at its input end that is perpendicular to the page of FIG. 1, as raised and lowered by a linear actuator (not shown). Discharge conveyor 34 is also adapted for side-to-side movement about a substantially vertical axis by operation of one or more additional actuators (also not shown). Asphalt paving material that falls through chute 30 onto discharge conveyor 34 is discharged through chute 36 at conveyor output end 38 into an asphalt receiving hopper of an asphalt paving machine (not shown in FIG. 1).

Hydraulic drive systems including hydraulic pumps and hydraulic motors are provided to drive the various augers and conveyors. An engine (not shown) is located within engine compartment 40 adjacent to operator's station 42 and provides the motive force for the hydraulic pumps that drive the hydraulic motors for the drive wheels, the augers and the various conveyors and other components of the vehicle.

Figure 2:
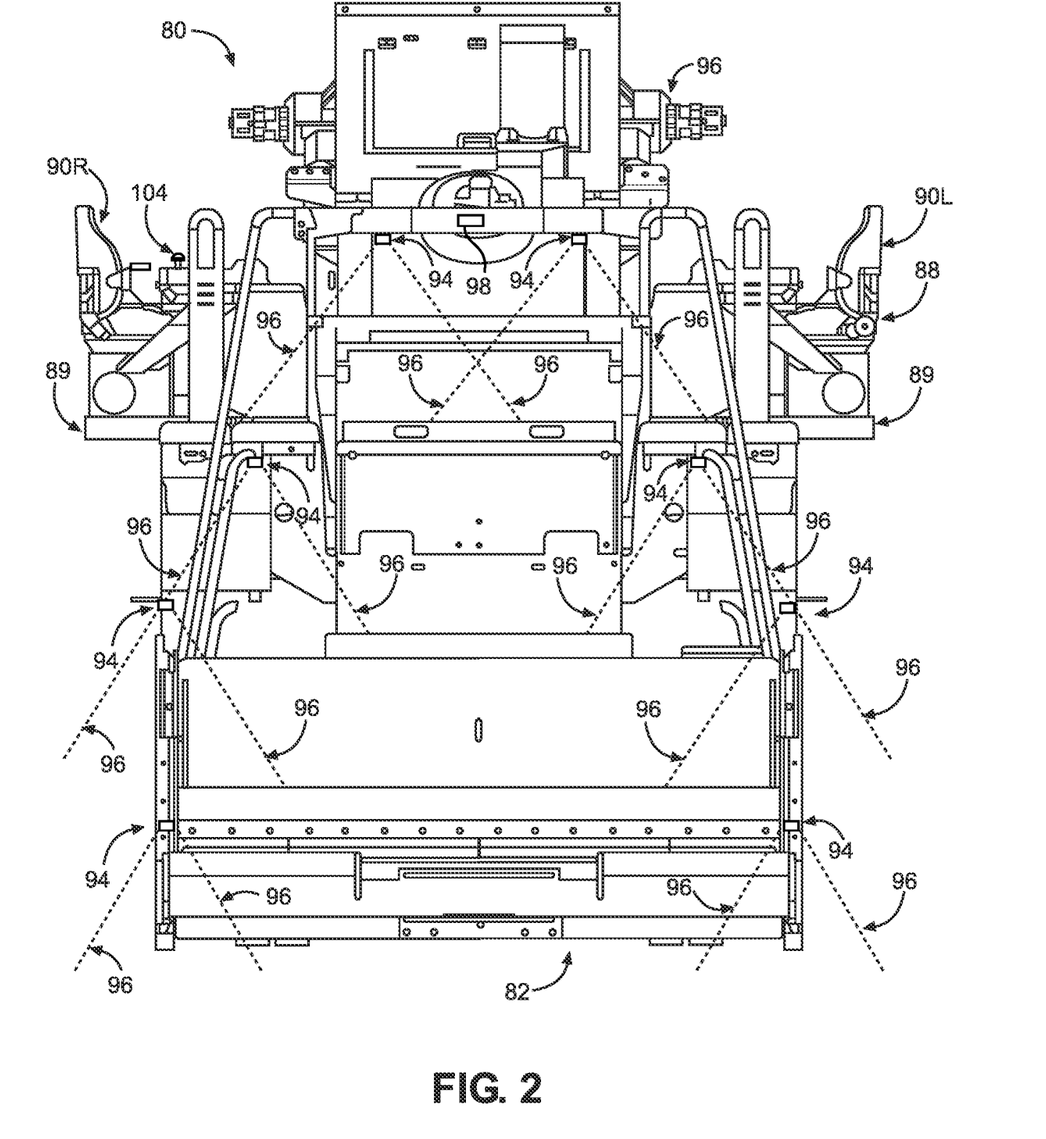
FIG. 2 is an end view of a material transfer vehicle similar to that shown in FIG. 1 that has been configured with a safety lighting system according to the invention.
Figure 3:
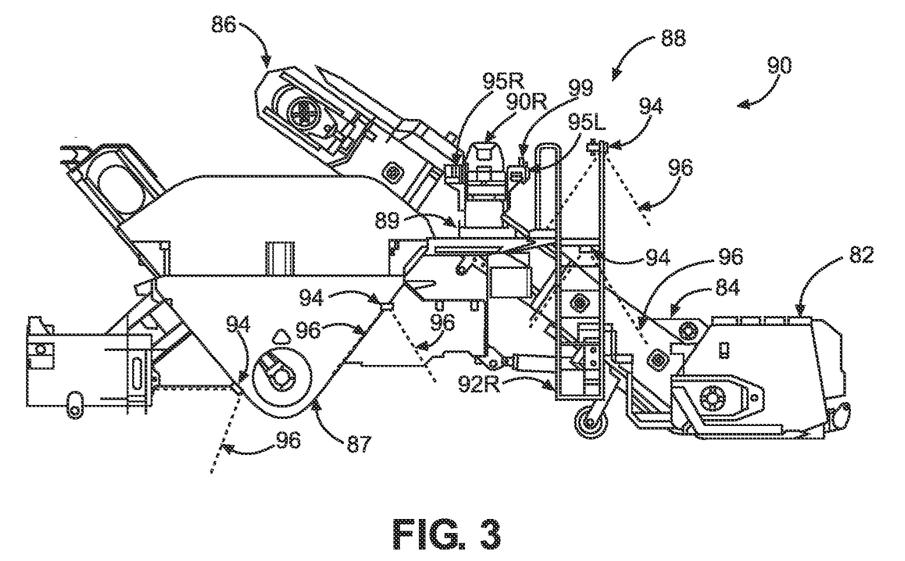
FIG. 3 is a side view of a portion of the material transfer vehicle shown in FIG. 2, illustrating a portion of the light pattern produced by a preferred safety lighting system of the invention.
Figure 4:
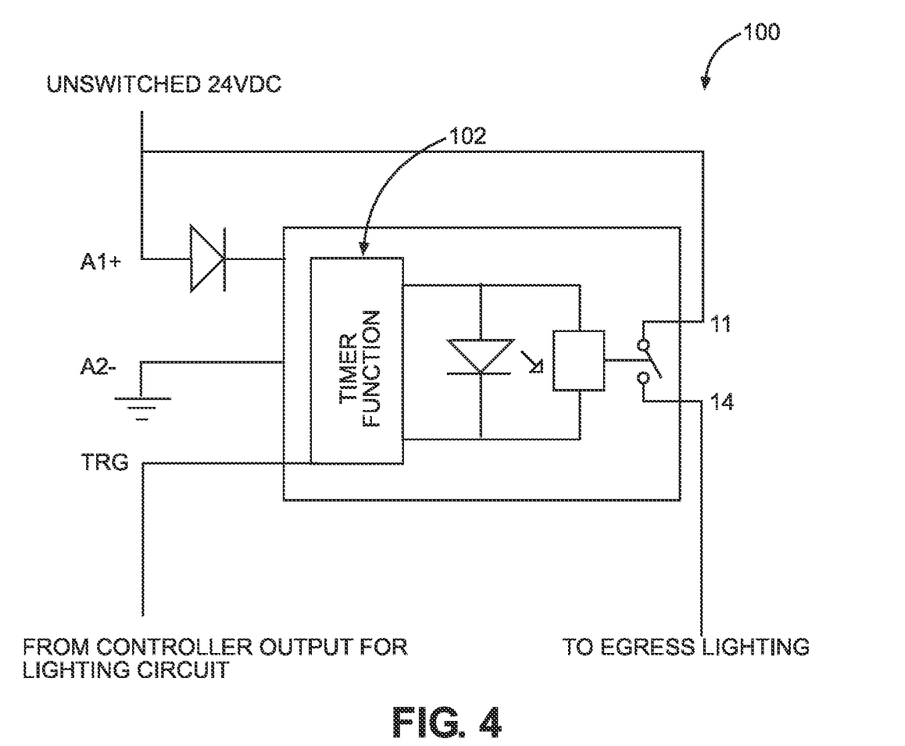
FIG. 4 is a schematic circuit diagram of a preferred embodiment of the invention.

FIGS. 2-4 illustrate a first embodiment of the invention. As shown therein, material transfer vehicle 80 is substantially similar to material transfer vehicle 10, except that it is provided with a safety lighting system according to the invention. Material transfer vehicle 80 includes an asphalt paving material receiving device comprising truck-receiving hopper 82 for receiving asphalt paving material from a delivery truck (not shown). In the alternative, vehicle 80 could be equipped with an asphalt paving material receiving device comprising a windrow pick-up head (not shown). An auger (not shown) is mounted in truck-receiving hopper 82 and is adapted to assist in conveying asphalt paving material from truck-receiving hopper 82 into loading conveyor 84, which in turn conveys the asphalt paving material off of its output end 86 and into surge bin 87.

Material transfer vehicle 80 also includes an operator's station 88 including operator's platform 89 on which are mounted operator's seat $90_R$ and operator's seat $90_L$. The two operator's seats are essentially identical, and are located on opposite sides of material transfer vehicle 80. The provision of two operator's seats on the operator's platform allows an operator to control all functions of the vehicle from whichever side of the vehicle offers the best view of the portion of the paving operation being conducted by vehicle 80.

As best shown in FIG. 3, an operator may climb onto operator's station 88 to operator's seat $90_R$ by means of access ladder $92_R$. A plurality of downwardly directed safety lights 94 are located so as to provide the operator with lighted egress from the operator's station. Thus, for example, safety lights 94 are located on or adjacent to the operator's station, on or adjacent to access ladder $92_R$, on or adjacent to truck-receiving hopper 82 and on or adjacent to surge bin 88. Each of the plurality of safety lights 94 projects a downwardly directed cone 96 of light. Safety lights 94 are operatively connected to a controller comprising left control panel $95_L$ and right control panel $95_R$ that controls all of the operations of material transfer vehicle 80, including the safety lights.

The controller may include a data output component such as a display screen, a secondary storage device, a processor and other components for running an application. Various circuits, including but not limited to power supply circuitry and hydraulic circuitry, may be associated with and operatively connected to the controller. Numerous commercially available microprocessors can be configured to perform the functions of the controller. It should be appreciated that the controller could readily be embodied in a general purpose computer or machine microprocessor capable of controlling numerous functions of material transfer vehicle 80.

In a preferred embodiment of the invention, the controller may also be operatively attached to light sensor 98, so that it can automatically turn on the plurality of safety lights 94 when light sensor indicates that it is dark. In other embodiments of the invention, the controller is operatively attached to the switch for powering on the material transfer vehicle and can be configured to automatically turn on the plurality of safety lights 94 whenever the material transfer vehicle is powered on, or alternatively, whenever the material transfer vehicle is powered off. In other embodiments of the invention, the controller is operatively attached to a switch 99 for the safety lights that is located on left control panel $95_L$, or to a switch that is located on right control panel $95_L$ (not shown) so that an operator may turn on the plurality of safety lights 94 at any time, regardless of whether material transfer vehicle is powered on.

The controller is operatively connected to safety light circuit 100, which includes the plurality of safety lights 94, and preferably timer 102. The controller may also be operatively attached to Emergency Stop button 104 (shown in FIG. 2) which may be used to power off the material transfer vehicle in an emergency. Thus, the controller can be programmed and configured so that when an operator powers off the material transfer vehicle 80, either in the normal shutdown fashion or by using Emergency Stop button 104, safety lights 94 will turn on and will remain lit for a predetermined period of time, such as for example, one minute. Alternatively, the controller can be programmed and configured so that when an operator powers on the material transfer vehicle 80, or when an operator activates switch 99 (whether or not the material transfer vehicle has been powered on), safety lights 94 will turn on, and when an operator powers off the material transfer vehicle, either in the normal shutdown fashion or by using Emergency Stop button 104, safety lights 94 will remain lit for a predetermined period of time, such as for example, one minute, to allow the operator safe egress from the material transfer vehicle.

Figure 5:
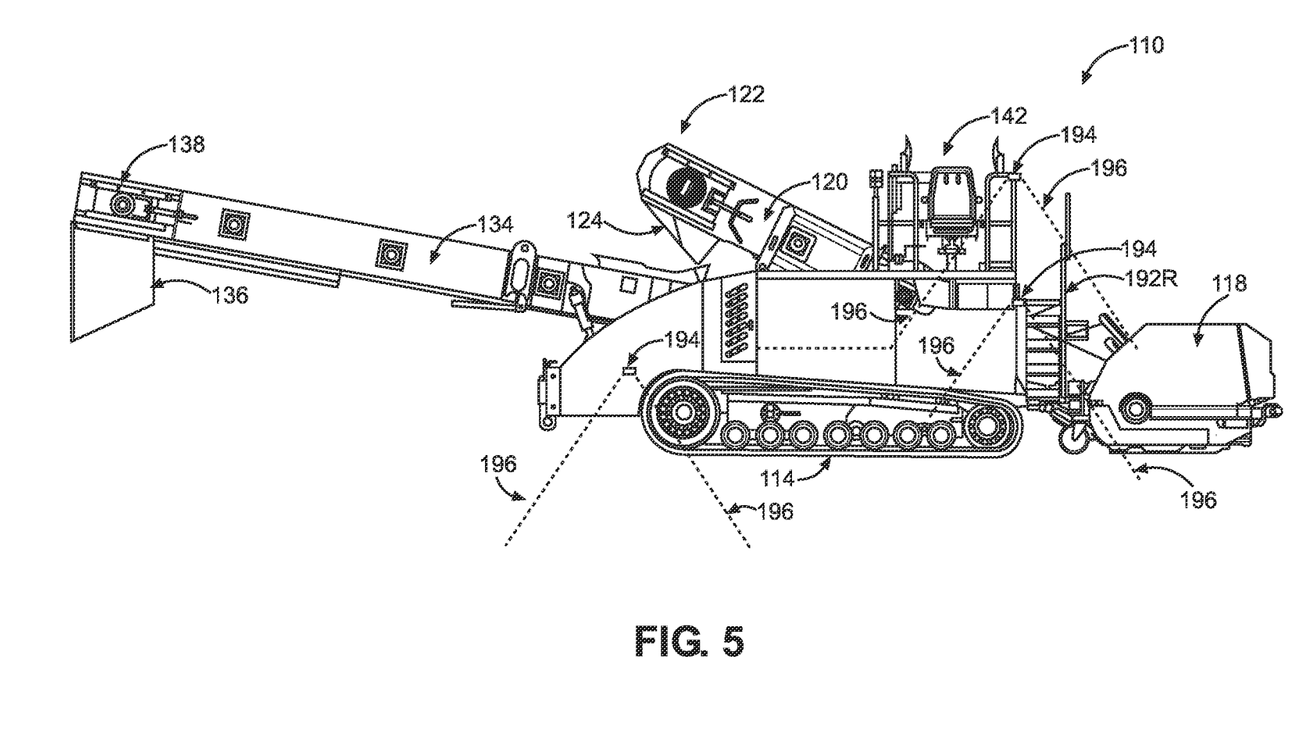
FIG. 5 is a side view of a second embodiment of a material transfer vehicle that has been configured with a safety lighting system according to the invention.

FIG. 5 illustrates a second embodiment of a material transfer vehicle 110 that has been configured with a safety lighting system according to the invention. As shown therein, material transfer vehicle 110 includes a frame that is supported on the roadway surface by right and left side ground-engaging drive assemblies comprising right side track-drive assembly 114 and a left side track-drive assembly (not shown) that is substantially similar to right-side track-drive assembly 114. Each of the track-drive assemblies is driven by a hydraulic motor (not shown) that is supplied with fluid under pressure by one or more hydraulic pumps (also not shown). In the alternative, the frame of the vehicle may be supported on the roadway surface by ground-engaging drive assemblies comprising a pair of front drive wheels (not shown) and a pair of rear drive wheels (also not shown).

Material transfer vehicle 110 includes an asphalt paving material receiving device comprising a truck-receiving hopper 118. Truck-receiving hopper 118 is adapted to receive asphalt paving material from a delivery truck (not shown). In the alternative, vehicle 110 could be equipped with an asphalt paving material receiving device comprising a windrow pick-up head (not shown). An auger (not shown) in truck-receiving hopper 118 is adapted to urge asphalt paving material into loading conveyor 120. Loading conveyor 120 is operatively attached to the truck-receiving hopper and is adapted to convey asphalt paving material from truck-receiving hopper 118 upwardly to its output end 122, from which it will fall through chute 124 onto the lower input end of discharge conveyor 134. Discharge conveyor 134 is mounted for vertical pivotal movement about a substantially horizontal pivot axis at its input end that is perpendicular to the page of FIG. 5, as raised and lowered by a linear actuator (not shown). Discharge conveyor 134 is also adapted for side-to-side movement about a substantially vertical axis by operation of one or more additional actuators (also not shown). Asphalt paving material that falls through chute 124 onto discharge conveyor 134 is discharged through chute 136 at conveyor output end 138 into an asphalt receiving hopper of an asphalt paving machine (not shown in FIG. 5).

Material transfer vehicle 110 also includes operator's station 142 from which all operating functions of the vehicle may be controlled via a controller similar to that comprised by left control panel $95_L$ and right control panel $95_R$ of material transfer vehicle 80. The controller is operatively connected to a safety light circuit that is substantially similar to safety light circuit 100 of material transfer vehicle 80, as well as to a plurality of downwardly directed safety lights 194, which are located so as to provide the operator with lighted egress from the operator's station. Thus, for example, safety lights 194 are located on or adjacent to the operator's station, on or adjacent to access ladder $192_R$, on or adjacent to right-side track-drive assembly 114. Safety lights 194 may also be located on or adjacent to a left-side track-drive assembly, as well as in other suitable locations. Each of the plurality of safety lights 194 projects a downwardly directed cone 196 of light. Safety lights 194 are operatively connected to a controller that controls all of the operations of material transfer vehicle 110, including the safety lights.

Figure 6:
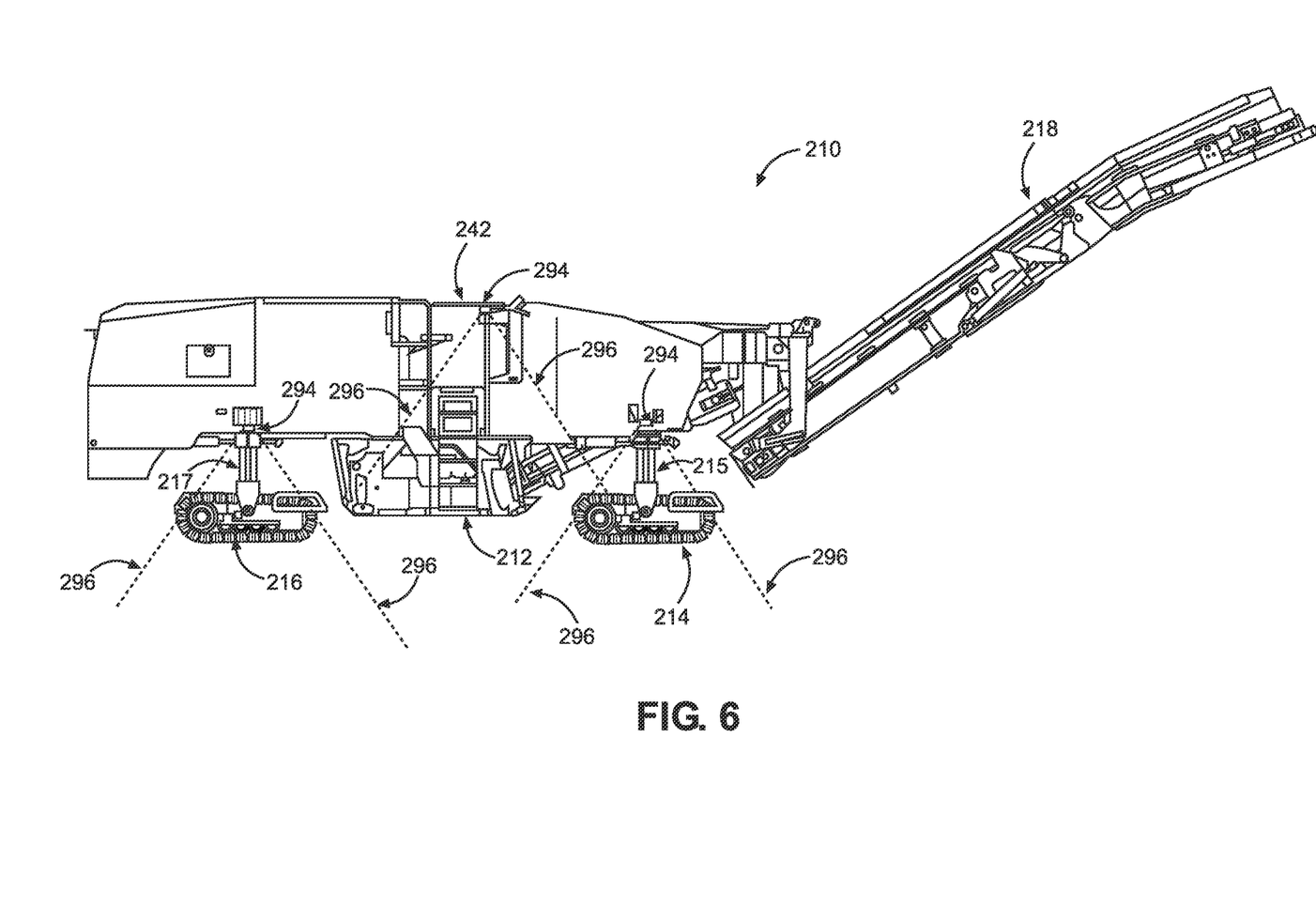
FIG. 6 is a side view of a milling machine that has been configured with a safety lighting system according to the invention.

FIG. 6 illustrates a milling machine that has been configured with a safety lighting system according to the invention. As shown therein, milling machine 210, includes a rotating working drum (not shown) that includes a plurality of cutting teeth. The drum is mounted in housing 212 on the frame of the machine and adapted to be lowered into contact with the road surface and rotated about a horizontal axis so as to cut into the surface to a desired depth as the machine is advanced along the roadway. Steerable ground-engaging drive assemblies are provided to drive the machine and to steer it along a desired milling path. As shown in FIG. 6, milling machine 210 includes right front track-drive assembly 214 that is mounted on the lower end of right front lifting column 215. A left front track-drive assembly (not shown, but substantially similar to right front track-drive assembly 214) is mounted on the lower end of a left front lifting column (not shown, but substantially similar to right front lifting column 215). Rear track-drive assembly 216 is mounted on the lower end of rear lifting column 217. In other embodiments of the invention, right and left rear track-drive assemblies can be provided, instead of a central rear track-drive assembly. In still other embodiments of the invention, the milling machine may be driven by wheel-drive assemblies. Power for driving the machine and for operating its systems is typically provided by a diesel engine. Milling machine 210 also includes a conveyor system including discharge conveyor 218 that is designed to carry the milled material which has been cut from the roadway by the rotating drum to a location in front of, to the rear of, or beside the machine for deposit into a truck for removal from the milling site.

Milling machine 210 is operated by an operator in operator's station 242, from which all operating functions of the milling machine may be controlled via a controller similar to that comprised by left control panel $95_L$ and right control panel $95_R$ of material transfer vehicle 80. The controller is operatively connected to a safety light circuit that is substantially similar to safety light circuit 100 of material transfer vehicle 80, as well as to a plurality of downwardly directed safety lights 294, which are located so as to provide the operator with lighted egress from the operator's station. Thus, for example, safety lights 294 are located on or adjacent to the operator's station, on or adjacent to right front lifting column 215, on or adjacent to rear lifting column 217. Safety lights 294 may also be located on or adjacent to a left front lifting column, as well as in other suitable locations. Each of the plurality of safety lights 294 projects a downwardly directed cone 296 of light. Safety lights 294 are operatively connected to a controller that controls all of the operations of milling machine 210, including the safety lights.

Figure 7:
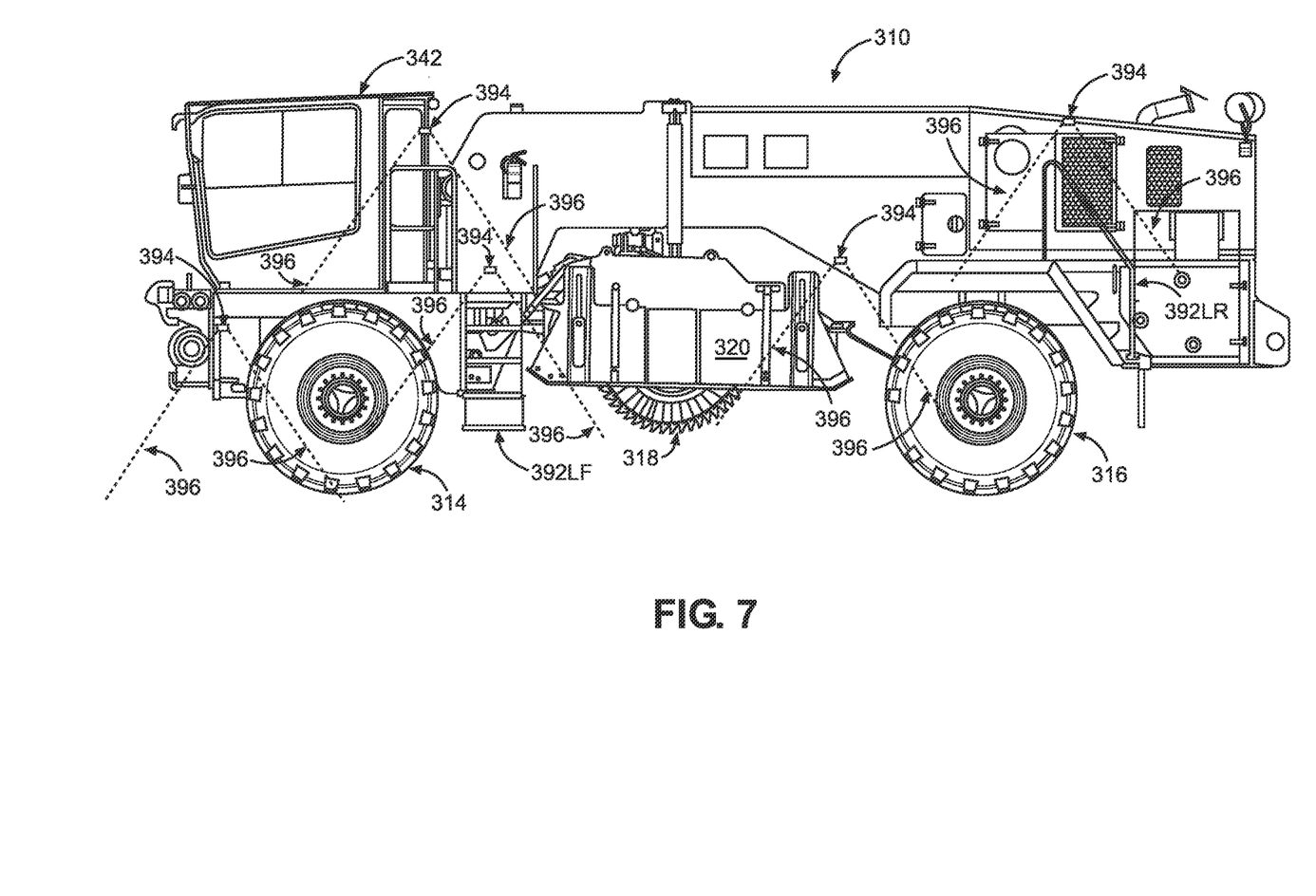
FIG. 7 is a side view of a road reclaimer/soil stabilizer machine that has been configured with a safety lighting system according to the invention.

FIG. 7 illustrates a road reclaimer/soil stabilizer machine that has been configured with a safety lighting system according to the invention. As shown therein, road reclaimer/soil stabilizer machine 310 includes a frame that is supported on the roadway surface by front and rear ground-engaging drive assemblies including left front drive wheel 314 and left rear drive wheel 316. Road reclaimer/soil stabilizer machine 310 also includes a right front drive wheel (not shown but substantially similar to left front drive wheel 314) and a right rear drive wheel (not shown but substantially similar to left rear drive wheel 316). Each of the drive wheels is driven by a hydraulic motor (not shown) that is supplied with fluid under pressure by one or more hydraulic pumps (also not shown). In the alternative, the frame of the road reclaimer/soil stabilizer machine may be supported on the roadway surface by ground-engaging drive assemblies comprising one or more left side track-drive assemblies (not shown), and one or more right side track-drive assemblies (also not shown), as is known to those having ordinary skill in the art to which the invention relates. Road reclaimer/soil stabilizer machine 310 includes a milling assembly comprising milling drum 318 with a plurality of cutter teeth mounted thereon which is contained within milling enclosure 320.

Road reclaimer/soil stabilizer machine 310 is operated by an operator in operator's station 342, from which all operating functions of the machine may be controlled via a controller similar to that comprised by left control panel $95_L$ and right control panel $95_R$ of material transfer vehicle 80. The controller is operatively connected to a safety light circuit that is substantially similar to safety light circuit 100 of material transfer vehicle 80, as well as to a plurality of downwardly directed safety lights 394, which are located so as to provide the operator with lighted egress from the operator's station. Thus, for example, safety lights 394 are located on or adjacent to the operator's station, on or adjacent to left front access ladder $392_{LF}$, on or adjacent to left rear access ladder $392_{LR}$, adjacent to left front drive wheel 314, and adjacent to left rear drive wheel 316. Safety lights 394 may also be located on or adjacent to a right front drive wheel and a right rear drive wheel, as well as in other suitable locations. Each of the plurality of safety lights 394 projects a downwardly directed cone 396 of light. Safety lights 394 are operatively connected to a controller that controls all of the operations of road reclaimer/soil stabilizer machine 310, including the safety lights.

Figure 8:
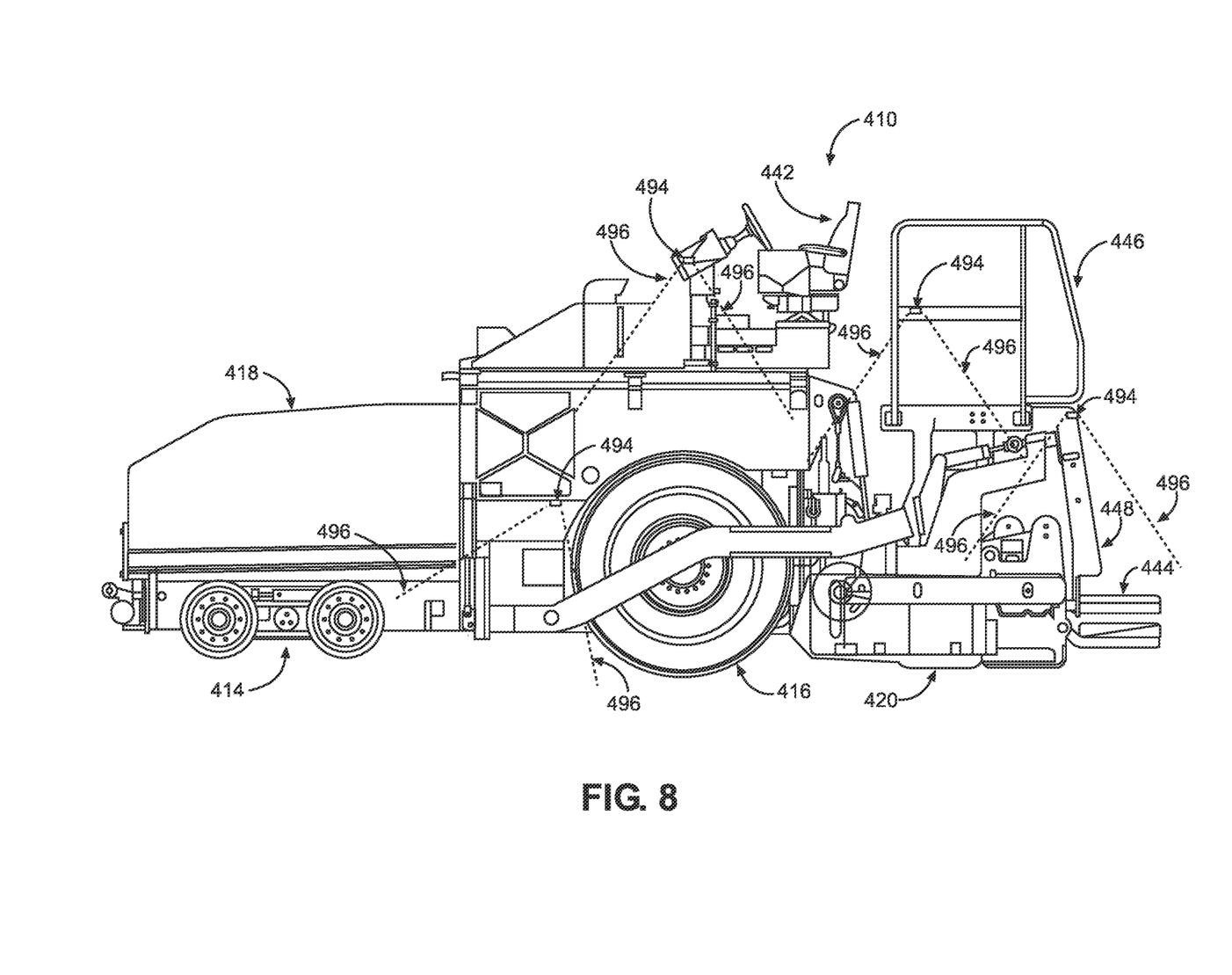
FIG. 8 is a side view of an asphalt paving machine that has been configured with a safety lighting system according to the invention.

FIG. 8 illustrates an asphalt paving machine that has been configured with a safety lighting system according to the invention. As shown therein, asphalt paving machine 410 is a self-propelled vehicle that is driven by a wheeled drive system including left front wheel assembly 414 and left rear drive wheel 416. Asphalt paving machine 410 also includes a right front wheel assembly (not shown but substantially similar to left front wheel assembly 414) and a right rear drive wheel (not shown but substantially similar to left rear drive wheel 416). Each of the drive wheel assemblies is driven by a hydraulic motor (not shown) that is supplied with fluid under pressure by one or more hydraulic pumps (also not shown). In the alternative, the frame of the asphalt paving machine may be supported on the roadway surface by ground-engaging drive assemblies comprising one or more left side track-drive assemblies (not shown), and one or more right side track-drive assemblies (also not shown), as is known to those having ordinary skill in the art to which the invention relates. Asphalt receiving hopper 418 is located at the front end of the machine to receive asphalt paving material, and a slat-type hopper conveyor located below the asphalt receiving hopper (not shown) transfers the asphalt paving material from the hopper to a distribution assembly comprising a transverse distributing auger (also not shown) that is mounted at the rear of the machine. The asphalt paving material is deposited onto and across the roadway or other surface to be paved by the distributing auger, and floating screed 420 located behind the distributing auger compacts the asphalt paving material to form an asphalt mat.

Asphalt paving machine 410 is operated by an operator in operator's station 442, from which all operating functions of the paving machine may be controlled via a controller similar to that comprised by left control panel 95$_L$ and right control panel 95$_R$ of material transfer vehicle 80. The controller is operatively connected to a safety light circuit that is substantially similar to safety light circuit 100 of material transfer vehicle 80, as well as to a plurality of downwardly directed safety lights 494. A ground operator may stand on screed platform 444 during a paving operation, and railing assembly 446 and an adjacent access ladder 448 allows the operator in operator's station 442 access to the screed platform. The plurality of downwardly directed safety lights 494 are located so as to provide the operators with lighted egress from the operator's station and the screed platform. Thus, for example, safety lights 494 are located on or adjacent to operator's station 442, on or adjacent to railing assembly 446, on or adjacent to access ladder 448 to the screed platform, and adjacent to left rear drive wheel 416. Safety lights 494 may also be located on or adjacent to a right rear drive wheel, as well as in other suitable locations. Each of the plurality of safety lights 494 projects a downwardly directed cone 496 of light. Safety lights 494 are operatively connected to a controller that controls all of the operations of asphalt paving machine 410, including the safety lights.

Figure 9:
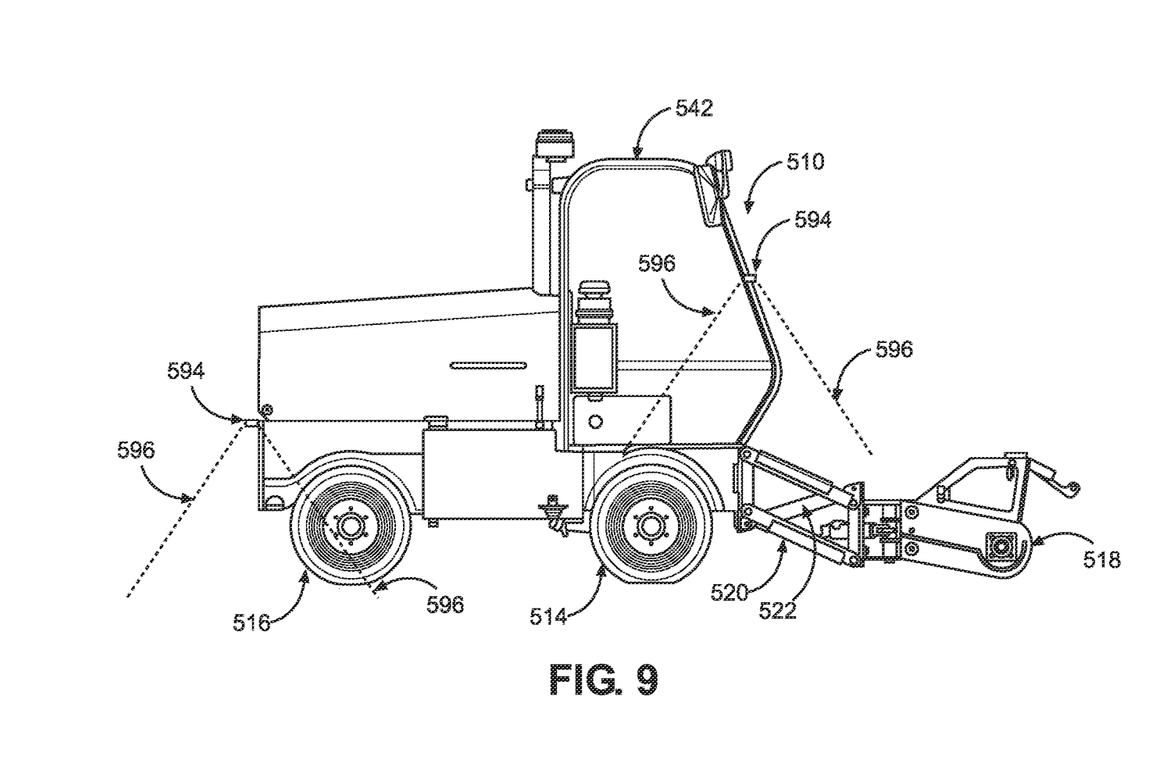
FIG. 9 is a side view of a roadway sweeping machine that has been configured with a safety lighting system according to the invention.

FIG. 9 illustrates a roadway sweeping machine that has been configured with a safety lighting system according to the invention. As shown therein, roadway sweeping machine 510 includes a frame that is supported on the roadway surface by front and rear ground-engaging drive assemblies including left front drive wheel 514 and left rear drive wheel 516. Roadway sweeping machine 510 also includes a right front drive wheel (not shown but substantially similar to left front drive wheel 514) and a right rear drive wheel (not shown but substantially similar to left rear drive wheel 516). Each of the drive wheels is driven by a hydraulic motor (not shown) that is supplied with fluid under pressure by one or more hydraulic pumps (also not shown). Roadway sweeping machine also includes broom support assembly 518 that is adapted to support and rotate a horizontally oriented broom (not shown). Broom support assembly 518 includes a four bar linkage assembly 520 to which linear actuator 522 is attached to raise and lower the broom with respect to the roadway surface.

Roadway sweeping machine 510 is operated by an operator in operator's station 542, from which all operating functions of the sweeping machine may be controlled via a controller similar to that comprised by left control panel 95$_L$ and right control panel 95$_R$ of material transfer vehicle 80. The controller is operatively connected to a safety light circuit that is substantially similar to safety light circuit 100 of material transfer vehicle 80, as well as to a plurality of downwardly directed safety lights 594, which are located so as to provide the operator with lighted egress from the operator's station. Thus, for example, safety lights 594 are located on or adjacent to operator's station 542 and adjacent to left rear drive wheel 516. Safety lights 594 may also be located on or adjacent to a right rear drive wheel, as well as in other suitable locations. Each of the plurality of safety lights 594 projects a downwardly directed cone 596 of light. Safety lights 594 are operatively connected to a controller that controls all of the operations of roadway sweeping machine 510, including the safety lights.

The invention thus provides a road working machine which is equipped with a safety lighting system for guiding the operator of the machine to allow a safe exit from the operator's station in the dark.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A road working machine comprising:
   (a) an operator's station that is adapted to be occupied by an operator of the road working machine;
   (b) a controller;
   (c) a safety light circuit that is operatively attached to the controller, said safety light circuit including:
      (i) a plurality of downwardly directed safety lights that are located so as to provide lighted egress from the operator's station;
      (ii) a timer;
   (d) an emergency stop button that is operatively attached to the controller and adapted to power off the road working machine;
   (e) wherein the controller is adapted to turn off the plurality of safety lights after the timer indicates that a predetermined period of time has elapsed after the road working machine is powered off by operation of the emergency stop button.

2. The road working machine of claim 1, wherein each of the plurality of safety lights projects a downwardly directed cone of light.

3. The road working machine of claim 1, wherein one of the plurality of safety lights is located on or adjacent to the operator's station.

4. The road working machine of claim 1:
(a) wherein the operator's station includes a railing assembly;
(b) wherein one of the plurality of downwardly directed safety lights is mounted on the railing assembly.

5. The road working machine of claim 1:
(a) which includes an access ladder that provides access to the operator's station;
(b) wherein one of the plurality of downwardly directed safety lights is mounted on the access ladder.

6. The road working machine of claim 1:
(a) which includes a light sensor;
(b) wherein the controller is operatively attached to the light sensor and is adapted to turn on the plurality of safety lights when the light sensor indicates that it is dark.

7. The road working machine of claim 1, wherein the controller is adapted to turn on the plurality of safety lights when the road working machine is powered on.

8. The road working machine of claim 1 which includes a switch that is operatively connected to the controller and adapted to be activated by an operator to turn on the plurality of safety lights.

9. The road working machine of claim 1 wherein the controller is adapted to turn off the plurality of safety lights after the timer indicates that a predetermined period of time has elapsed after the road working machine is powered off.

10. The road working machine of claim 9, wherein the controller is adapted to turn off the plurality of safety lights after the timer indicates that one minute has elapsed after the road working machine is powered off.

11. The road working machine of claim 1, wherein the controller is adapted to turn off the plurality of safety lights after the timer indicates that one minute has elapsed after the road working machine is powered off by operation of the emergency stop button.

12. The road working machine of claim 1:
(a) further comprising a material transfer vehicle having an asphalt paving material receiving device and a discharge conveyor that is adapted to convey asphalt paving material to the receiving hopper of an asphalt paving machine;
(b) wherein one of the plurality of downwardly directed safety lights is mounted on the asphalt paving material receiving device.

13. The road working machine of claim 12:
(a) which includes a surge bin;
(b) which includes a loading conveyor that is operatively attached to the asphalt paving material receiving device and is adapted to convey asphalt paving material from the asphalt paving material receiving device to the surge bin;
(c) wherein one of the plurality of downwardly directed safety lights is mounted on the surge bin.

14. The road working machine of claim 1
(a) further comprising a milling machine having a plurality of ground-engaging drive assemblies, each of which is mounted on a lifting column;
(b) wherein one of the plurality of downwardly directed safety lights is mounted on one of the lifting columns.

15. The road working machine of claim 1
(a) further comprising an asphalt paving machine having a floating screed;
(b) wherein one of the plurality of downwardly directed safety lights is mounted on or adjacent to the floating screed.

16. The road working machine of claim 1
(a) further comprising a roadway sweeping machine having a drive wheel;
(b) wherein one of the plurality of downwardly directed safety lights is mounted adjacent the drive wheel.

* * * * *